Oct. 14, 1958
D. L. HALL ET AL
2,856,491
ELECTRICAL CONTACT ALLOY OF PLATINUM GROUP
METAL AND ZINC AND METHOD OF MAKING SAME
Filed Sept. 27, 1952
6 Sheets–Sheet 2
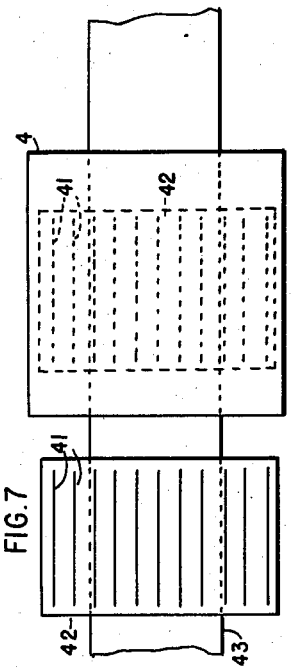
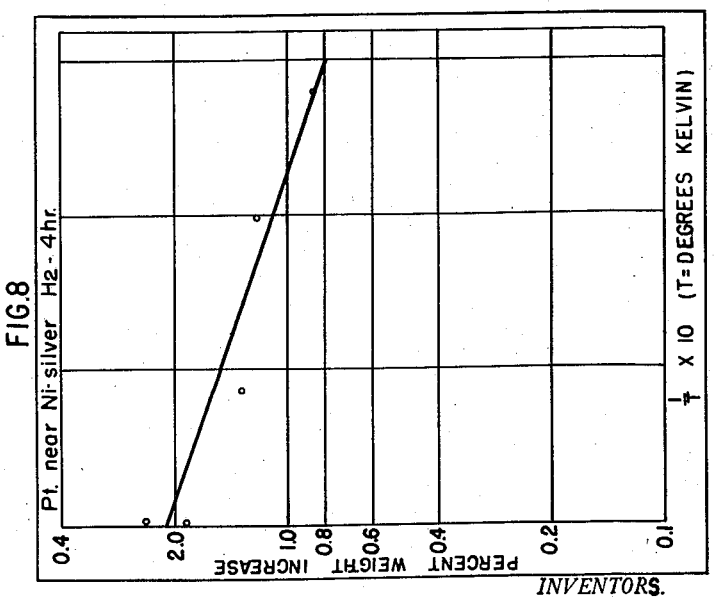
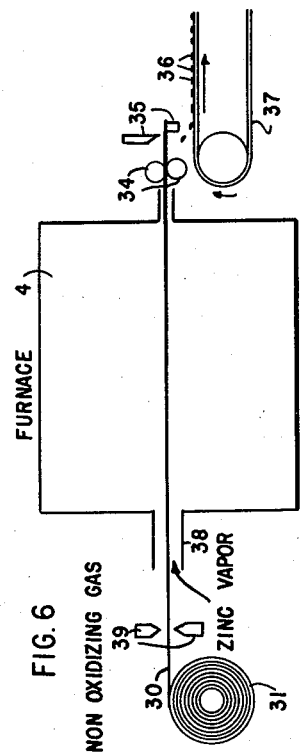
INVENTORS.
DONIVAN L. HALL
ARTHUR E. MIDDLETON
BY EARL R. OLSON
Brown, Jackson, Boettcher & Dienner
ATTYS.

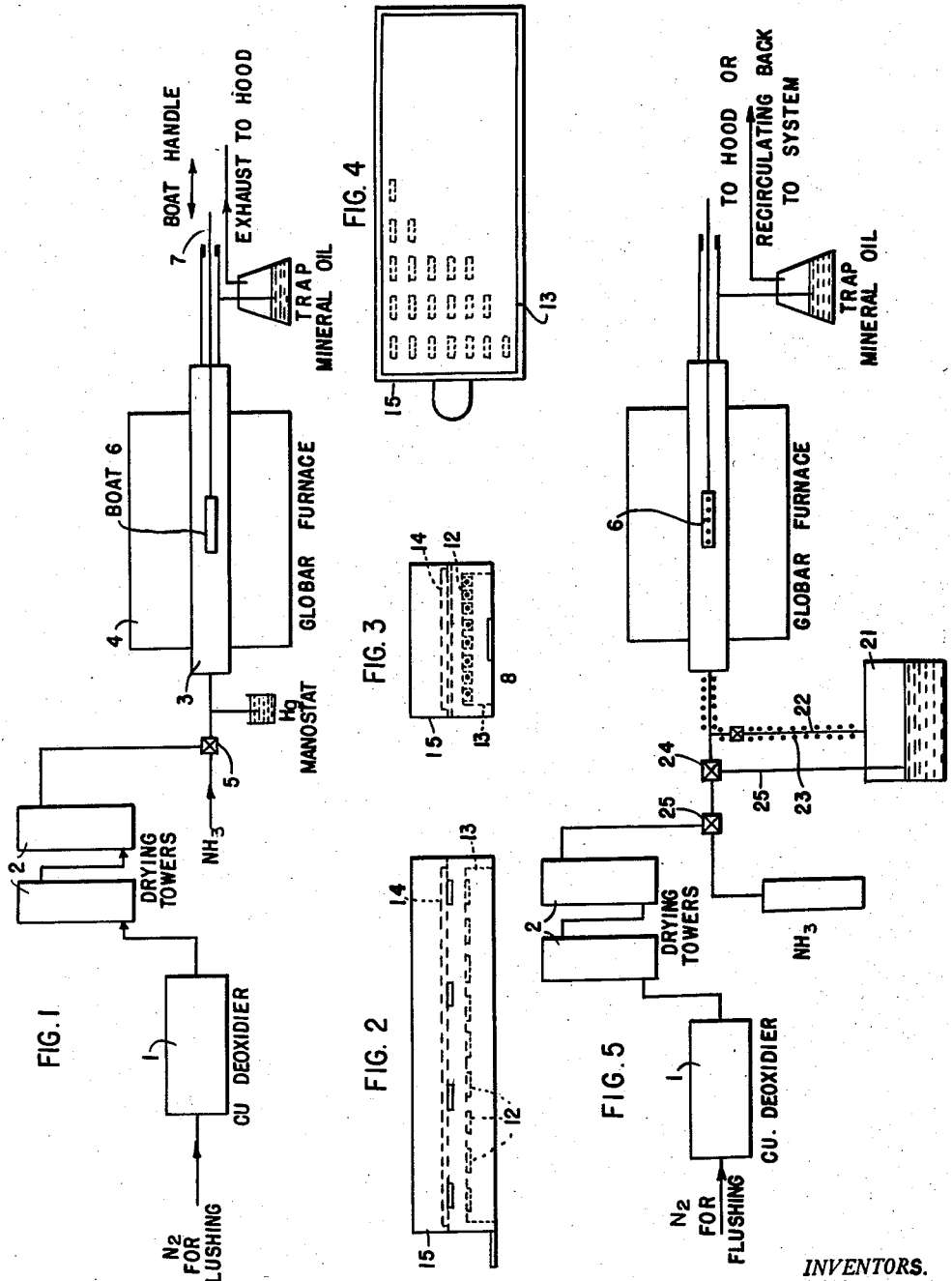

2,856,491

ELECTRICAL CONTACT ALLOY OF PLATINUM GROUP METAL AND ZINC AND METHOD OF MAKING SAME

Donivan L. Hall, Galion, and Arthur E. Middleton and Earl R. Olson, Columbus, Ohio, assignors, by direct and mesne assignments, to North Electric Company, a corporation of Ohio Application September 27, 1952, Serial No. 311,872

8 Claims. (Cl. 200—166)

The present invention relates to a new and novel alloy composition which is particularly adapted for use in electrical equipment, to a method of making same, and to an electrical member made therefrom. In particular, the present invention relates to novel electrical contact members which are especially adapted for use in telephony, telegraphy, and other co-related fields.

There is a definite need in the electrical field for a contact material which exhibits a reasonable life span in its use in the field, this problem having been set forth in some detail in a co-pending application which was filed by Hall et al. on July 10, 1951, which received Serial No. 235948, now U. S. Patent No. 2,787,688, issued April 2, 1957, and which was assigned to the assignees of this invention. The application set forth an answer to this problem in the form of a novel electrical contact member of a palladium-zinc alloy which proved successful in its use in telephone relay equipment.

One specific problem which existed prior to the discovery of this alloy was the inability of contacts made of existing materials to withstand the deteriorating effects of repeated pulsing in circuits of relatively low current and high inductance, which contacts include conventional contact protection.

Life tests have indicated that an increased life span of 10 to 20 times may be expected with the use of contacts made of the alloy of the co-pending application. Further, the inherent properties of contacts made of this alloy are such as to reduce erosion, avoid sticking, and eliminate open circuits (that is, the material has a high resistance to the formation of an insulating film).

The present disclosure is a continuation-in-part of the aforementioned application, and has as its object the provision of other novel alloys comprised of members of the platinum family and zinc, which may be used in similar applications to provide a further answer to these problems. It is understood that the platinum family includes as members thereof platinum, palladium, iridium, osmium, ruthenium and rhodium. It is a specific object of the invention to provide novel alloys of this family in a solid mass which lend themselves for use as contacts in the telephone field.

These, and other objects and advantages of the present invention, will become more apparent from the following detailed description, examples and drawings, wherein:

Figure 1 is a schematic diagram of an apparatus arrangement for producing the new and novel composition of the present invention;

Figure 2 is a diagrammatic side elevation view of a device showing an arrangement of elements on a tray for high production purposes;

Figure 3 is an end view of the device shown in Figure 2;

Figure 4 is a plan view of the device shown in Figure 2;

Figure 5 is a schematic diagram of another apparatus arrangement, similar to that shown in Figure 1, for effecting the purpose of the present invention;

Figure 6 is another schematic diagram of an apparatus arrangement, similar to Figure 1, but designed for continuous operation;

Figure 7 is a diagram of a system arranged for continuous batch operation;

Figure 8 is a diagram showing the effect on the weight increase with temperature variations;

Figure 9 is a diagram showing the rate of weight increase with time;

Figure 10:
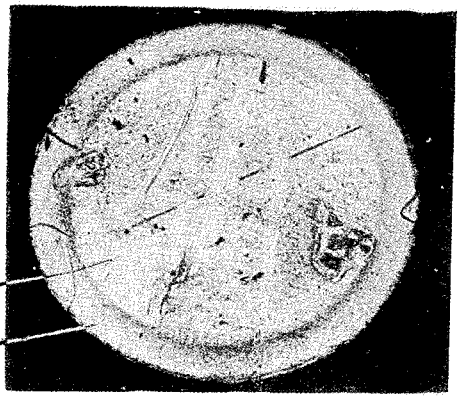
Figure 10 is an enlarged polished and etched cross-sectional photomicrographic view of a novel composition of the present invention showing the casing, and the first and second phases obtained with a given treatment.

It has now been discovered that by treating platinum, and other members of the platinum family singly or in combinations in the presence of an adequate concentration of zinc vapor at a given temperature and for a given period of time, the zinc is caused to diffuse into the member or members of the platinum family to form a composition of matter which is characterized by remarkable wear and endurance properties. In the use of platinum alone, for example, the resulting material may take the form of a casing on a platinum rich core, or a plurality of "phases" exhibited in the thickness. "Phase," as used in the specification and in the claims, means a homogeneous, physically distinct portion of an alloy. It is evident that by selecting different members of the platinum family and by varying the percentage by weight of zinc in the resultant alloys a variety of phases of varying thicknesses can be produced in the resultant alloy. Each phase exhibits given characteristics whereby the various phases may have preferred applications in keeping with its characteristics. It has been discovered, for example, that the first phase, or alternatively a first phase core with a second phase casing, are particularly well suited for use as electrical contacts, it having been proven by comparative tests that a member having these phase embodiments will have a life expectancy of at least ten times the life of contacts made of conventional materials. The $Pt_5Zn_{21}$ phase of this alloy exhibits other desirable characteristics, such as extreme hardness.

This new and novel alloy has good electrical and thermal conductivity in each phase, is readily secured to current carrying members or armatures, and is more resistant to the formation of chlorides, hydroxides, oxides and sulfides than a number of materials now commonly used in electrical equipment.

Platinum and zinc have hardnesses of 55 to 100 and 40 to 50 Knoop numbers respectively. However the alloys of platinum and zinc have a Knoop number of greater value than the platinum and zinc have individually. For example, the alloy in its first, or alpha, phase may contain approximately up to 10% by weight of zinc, the balance platinum and has a hardness of 150 Knoop numbers; in its second, or PtZn, phase, the alloy will comprise a tetragonal form of platinum-zinc alloy containing from about 10 to about 35% by weight of zinc and has a hardness of 200–275 Knoop numbers; and in a higher phase the alloy will take the form $Pt_5Zn_{21}$ containing about 60% zinc and the balance platinum, and has a hardness of 350 Knoop numbers.

A member made of the alloy in one, several or all of the aforegoing phases may be provided by varying the process as desired, these methods being more fully described hereinafter. For example, a novel method by which the noble metal platinum is alloyed with zinc to provide a solid mass alloy of one or more preferred phases, and a novel method of providing an electrical contact of that material are now set forth hereat.

In general, a new and novel contact of the present invention may be prepared by diffusing zinc into platinum, or a member of the platinum family, at high temperatures in the presence of a nonoxidizing gas. One system and method are set forth in Figure 1 of the drawings, it being understood that variations of the system will effect corresponding changes of time, temperature, etc., and are considered to be within the scope of this invention. As there shown, the system is first flushed with nitrogen which is passed through a copper deoxidizer 1 and drying towers 2—2 and into a quartz reaction tube 3 of a globar furnace 4, and thence to the hood. After flushing, a valve 5 between the drying towers and the tube is turned on to introduce a continuous stream of inert or reducing gas into the system after which the nitrogen is cut off. A Vycor or metal boat having a long handle, schematically indicated at 7, and containing platinum contacts, or contacts of a metal of the platinum family, and an excess of a source of zinc, is then pushed into the hot zone of the quartz tube 3 of the furnace. It is not necessary that the zinc source be placed in physical contact with the platinum or platinum family contacts.

The system is operated at elevated temperatures for periods of ½ hour to several hours, at the end of which time the contact members comprise the novel platinum-zinc alloy. The contacts are then permitted to cool therein and upon removal are ready for immediate use as electrical contact members without further treatment.

Any source of zinc in which the zinc very readily volatilizes therefrom at the temperatures employed may be used in the system. It is not necessary that the contacts be rotated or that their positions be changed in the process, or that the zinc source be piled around the contacts, for the zinc vapor appears to very readily diffuse through all the surfaces of the contacts to provide an even and uniform penetration thereof.

As shown in Figures 2, 3 and 4 one method of producing the platinum-zinc or zinc platinum family contacts in quantity may comprise placement of the platinum contacts 8 in slots 12 of a ceramic tray 13 in a boat or holder 15 with a sheet 14 being inserted thereabove as the zinc source.

In Figure 5 there is shown another apparatus similar to that shown in Figure 1 except that the zinc vapor from the zinc retort distiller 21 is led through piping 22, surrounded by heating elements 23 to maintain the zinc in a vaporized form, to a mixing valve 24, where it is fed into the hot zone of the globar furnace 4 to contact the platinum or platinum family elements supported in the holder 6. The amount of the zinc vapor entering the system and in contact with the platinum as well as the gas flow rate, can be very easily controlled by means of the valves in the lines leading to the furnace. A back pressure line 25 supplies gas under pressure to force the zinc vapor toward the furnace. It is to be understood that means for collecting the excess zinc at the exit of the tube can be employed so that the zinc may be re-used in lieu of the zinc vapor recirculating system.

A method for continuously treating a platinum wire or strip 30 is illustrated in Figure 6 and, as there shown, the platinum wire or strip is passed from a roll 31 into the furnace 4 and is pulled through the furnace by means of rollers 34—34 where a knife or other separating means 35—35 segments it into the desired lengths 36 which fall on conveyors 37. The speed with which the wire passes through the furnace may be varied to alter the time of treatment of the passing metal. The zinc vapor and nonoxidizing gas may be led into the furnace through the same port 38 or through separate control means. The wire may be serrated by suitable notching means 39—39 at predetermined intervals along its length prior to entry into the furnace 4 and, as a result of the thinness of the material at the point of the serration, the casing will form on a greater portion of the contact surface. That is, as the wire emerges from the furnace and is segmented by the knife 35, substantial portions of the ends of the individual pieces will have a casing similar to that of the major portion of the contact.

In Figure 7 there is shown a schematic sketch which illustrates generally a method of providing a continuous batch treatment of platinum wire or strips 41, in which a series of strips are mounted on each of the frameworks 42 of ceramic or other suitable materials which are carried by a conveyor 43. At predetermined time intervals, the conveyor 43 operates to move a prepared batch of wires 41 into the furnace 4, and a treated batch of wires 41 out of the furnace 4. Suitable automatic means for loading the conveyor and for removing the alloyed strips from the framework and cutting same into the desired lengths may be used with the illustrated system in an obvious manner. Other systems for diffusing the zinc into platinum metal at high temperatures or the use of the reducing or inert gases are considered to be within the scope of this invention. It is understood also that the foregoing methods may be used to provide contacts composed of alloys of the platinum family and zinc.

The platinum or platinum family members to be coated may be of any form, shape or thickness, the illustrated sheets and wires being merely shown herein for purposes of example.

The source of zinc in this particular method is placed within the furnace closely adjacent the platinum, or alternatively, the zinc vapor is supplied in a high concentration from an outside source of supply. Differences in the quantity of zinc required will obviously be dependent upon times, temperatures, thicknesses of coating desired and its design and efficiency, an excess of zinc being generally supplied to the system in most instances to insure thorough penetration. The use of a source of zinc in a ratio of 10 to 1 (zinc to platinum) has been found to be satisfactory.

A very good source of zinc vapor from which the evolution of zinc is not too rapid is an alloy of copper, nickel and zinc (called Nickel Silver) containing 13 to 27% zinc, which is placed in short strips about the platinum. For example, "Nickel Silver 18%A" contains 65% copper, 18% nickel and 17% zinc and "Nickel Silver 18%B" contains 55% copper, 18% nickel and 27% zinc. Any alloy which will furnish zinc as a vapor by diffusion therefrom, as for example German Silver, or a compound such as zinc carbonyl, cyanide, or nitrate are satisfactory materials for use in the process. Pure zinc may also be used, the zinc in such case being volatilized in the furnace or in a separate still and then piped thereto. Obviously a material which contains little zinc or furnishes only a small amount will have to be used in larger quantities and vice versa.

The reaction tube may be composed of quartz or other high temperature materials. One material commercially available as Inconel comprises 80% nickel, 14% Cr and 6% iron, its solidus temperature being 1395° C. and its liquidus temperature 1425° C. The alloy is known to be resistant to corrosion by nitrogen and hydrogen at elevated temperatures, and it has been successfully used with ammonia in nitriding operations. In the use of this particular alloy the inlet end of the furnace set forth in Figure 1 might well be adapted to permit removal of the tube through the muffle for cleaning purposes. The tube could be tapped and a threaded plug having an inlet tube for gases and well extending to the hot zone to receive the thermocouple, could be used therewith. The outlet end of the tube might be fitted with a flange on which are provided several studs equipped with wing nuts. A flat end plate containing the outlet tube for gases could be slotted to receive the studs and fastened in place by the wing nuts. Cooling for the tube ends could be effected by circulating water in coils of copper tubing.

The atmosphere which is used in the furnace in these methods apparently acts as a carrier for the zinc and appears to have desirable cleansing and fluxing properties. The gas therefore should not be deleterious with respect to zinc, platinum, or the resulting alloy. Gases which have been found to be acceptable include any nonoxidizing or essentially oxygen free gas which also includes gases which are inert or reducing. By way of example, gases which have proven satisfactory in the process include ammonia, argon, helium, hydrogen and nitrogen. Other gases having similar nonoxidizing characteristics may be used, these gases being merely exemplary for purposes of disclosure. Certain of these gases but not all, may form inclusions at various points in the cross section of the resulting contacts. However, such inclusions in very minor amounts do not apparently affect the properties of the resulting alloys.

The useful gases can be used singly or mixed together, or in any order. In the process, the passage of the gas through the system when effected at a rate of about one to five liters per minute has been found to be very efficient in causing proper zinc diffusion and concentration.

The temperature range in providing the novel platinum-zinc contact alloys of the invention will vary from 700 to about 1200 degrees Centigrade with the apparatus utilized in the test. Designed variations of the described system can be used to effect variations in the temperatures which are within the scope of the invention.

Figure 8 shows the correlation between weight increase and temperature in the platinum-zinc alloy for a given time. The characteristics of a substitutional diffusion process are shown by the practically straight-line function of log of weight increase vs. the reciprocal of the absolute temperature, the weight increase relation for platinum-zinc alloys providing a more accurate picture of the alloy formation for temperature differences than a case thickness relation. In other words, the weight increase will be found to vary with temperature according to the diffusion laws, i. e., the log of the weight increase is proportional to the reciprocal of the absolute temperature. The law governing temperature dependence of diffusion in metals is expressed by the equation $$D = Ae - \frac{Q}{RT}$$

where D is the diffusion coefficient of Zn in Pt, A is a constant dependent upon the metals involved, and Q provides a measure of the activation energy of the reaction required to cause diffusion. Both A and Q are practically independent of temperature. R is the gas constant, and T is the absolute temperature. It can also be shown that D is approximately proportional to $x^2$, where $x$ is the displacement of particles across an area of unity. It can be seen, therefore, that a log plot of D, or a log plot of weight increase, as a function of $1/T$ yields a straight line. Further, some change in phases is noted as the temperature or the time, or both, are varied. For example, Figure 9 shows weight increase as a function of time at a given temperature, greater quantities of zinc being absorbed with longer periods of time.

The process can be carried out for any length of time to vary the alloy being produced. A treating period of more than 12 hours in the described system, for example, provides an alloy of higher zinc content. Good results, as to case thickness, hardness, efficiency of method, etc., have been obtained utilizing a period of time of from 30 minutes up to 12 hours.

A satisfactory diffusion of zinc into platinum constitutes penetration into one-half the radius of the wire, or about 2% total weight of zinc, which may be obtained by treating for 4 hours at 1000° C. in the presence of an excess of zinc. Heating at or above 1000° C. for any appreciable length of time in an atmosphere void of zinc may cause loss of zinc through volatilization.

The following examples will serve to illustrate the various methods of providing various alloys of the platinum family and zinc, the manner of providing individual phases of each of these alloys, the manner of providing alloys of this family having several of the phases thereof, and particularly the manner of providing an alloy including the first phase which has proven extremely satisfactory for use in certain electrical contact applications. Other methods within the scope of the invention will be apparent to parties skilled in the art with reference to the following disclosure.

EXAMPLE 1

Platinum wire .020 inch in diameter was sectioned and polished and a series of nine Knoop hardness indentations were placed on a diameter across the cross section. Distances across all indentations were measured using 250 X magnification and a micrometer eyepiece. The distances from wire edges to adjacent indentations were also noted. The specimen was then heated at 1,000° C. for 4 hours in the presence of thirty parts "nickel silver" (an alloy containing 55% Cu, 18% Ni, 27% Zn) to one part of Pt, under an atmosphere of nitrogen in the furnace utilizing the apparatus that is shown in Figure 1. The gas flow rate was 3,000 cc./min.

After treatment the specimen was re-measured in the same manner and the following results were observed.

The distances as measured and as indicated below are in inches.

*Before treatment*

```
———.0052———                              ———.0056———
——.0028——                                | ——.0032——
(.0012  .0016 | .0024 | .0023  .0025  .0024  .0024 | .0024 | .0016  .0016)
```

*After treatment*

```
———.0057———                              ———.0061———
(.0032        .0025 | .0024  .0024  .0024  .0024 | .0026  .0035  )
```

*Differences*

```
———.0005———                              ———.0005———
(.0004        .0001 | .0001  −.0001   0     0  | .0002  .0003  )
```

Figure 10, 100 X, shows a sample of the material as produced by this method under the conditions given. The sample as shown thereat has been sectioned, polished and electrolytically etched to show the case obtained at 1050° C. for 9 hours. In the figure the central core 41 is Pt in which some zinc is dissolved, and constitutes the first, or alpha, phase of the alloy. The area or zone 42 designated as the case is a mixture of the alpha and PtZn phases and has the predominantly tetragonal structure. Contacts made by process and subjected to given test conditions along with the control platinum contact which did not have the treatment indicated that an increase in life span of at least 10 times may be expected.

EXAMPLE 2

The aforementioned process was repeated using $H_2$, He, and $NH_3$. No change in zinc diffusion was observed.

EXAMPLE 3

*Melt process.*—Platinum zinc alloys were prepared by a melt process in the following manner. The platinum and zinc were measured in powdered form to the desired composition on an analytical balance, the samples for experimental purposes being of the order of one or two grams in weight. Next, the samples were thoroughly mixed and compacted at about 70,000 p. s. i. in a one quarter inch cylindrical die to insure a mass which was dense enough to develop sufficient eddy currents for melting. The specimens were then placed in alundum crucibles and melted at normal pressures with controlled heating under an inert atmosphere in an induction heater, the batch being held in the molten state for about five minutes to insure homogeneity.

Figure 14:
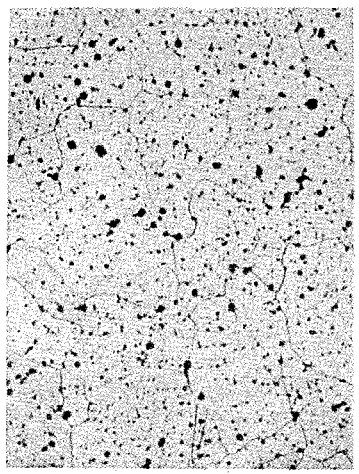
Figures 14, 15, 16 and 17 are photomicrographs (100 X) of etched specimens of platinum-zinc, having ratios of 5%, 10% 15% and 20% zinc respectively.
Figure 15:
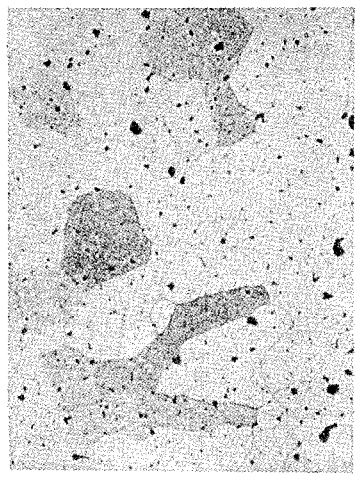
Figure 16:
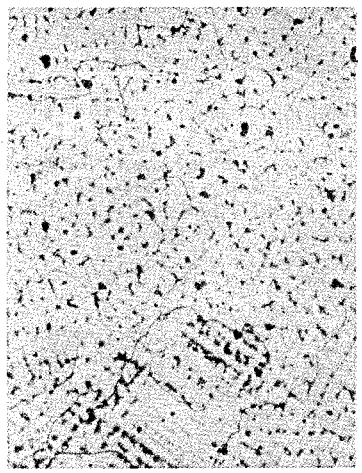
Figure 17:
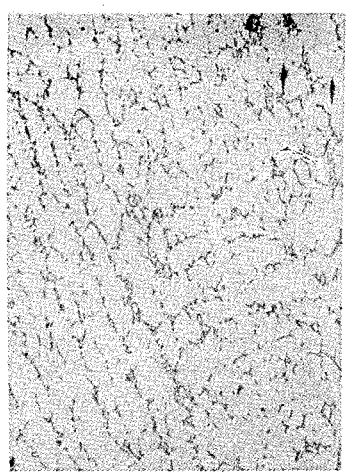

Figure 14 is a photomicrograph (100 X) of an etched specimen of 5% Zn–95% Pt (alpha phase of the alloy platinum-zinc) made according to the above method. Figure 15 is a photomicrograph (100 X) of an etched specimen of 10% Zn–90% Pt, Figure 16 is a photomicrograph (100 X) of an etched specimen of 15% Zn–85% Pt, and Figure 17 is a photomicrograph (100 X) of an etched specimen of 20% Zn–80% Pt, all of which were made by the melt method.

This method has the advantage of speed in producing platinum and zinc alloys.

In the preparation of contacts from the alloy manufactured by this process, thin sheets were cut, ground, and polished on both sides to a thickness of 15 to 20 mils and contacts were then sliced from the thin sheets.

EXAMPLE 4

The alloy was also made by the packing method which involved subjecting the noble platinum metal to heat treatment while it is embedded in an intimately mixed pack of powdered alumina, $Al_2O_3$ and zinc and heating at approximately 750° C. for approximately 30 minutes. The alloy has been made in its $Pt_5Zn_{21}$ phase by this method.

EXAMPLE 5

A small ingot of low zinc content palladium-zinc for wire drawing was provided by mixing powder compacts of the desired composition and weight and sintering same at 500° C. for six hours and 900° C. for one hour. The compacts were then melted and cast in a centrifugal casting device, the molds used being 1/10 inch in diameter and four inches long. The molds were preheated to 2,000° F. and the melting was accomplished with a reducing oxyacetylene flame in a crucible designed with an outlet to the mold. With the charge in a molten state, and the mold in place, the centrifugal mechanism was actuated. Several phases of the alloy were cast in this manner.

EXAMPLE 6

An ingot of palladium-zinc was cast by an induction melting method in which the alloy to be melted was placed in a porcelain crucible and inserted inside a chamber made of Vycor glass which is inside the induction coil. The top of the glass chamber was closed with an alundum stopper and helium was admitted into the chamber through an inlet in the bottom, and exhausts around the alundum stopper. A quartz tube having an inside diameter similar to the desired ingot diameter was admitted into the chamber through a hole in the alundum stopper. The quartz tube was connected by a rubber hose to an exhausting hand pump so that as the alloy becomes molten, the end of the quartz tube is lowered into the melt, the tube is exhausted, and the molten metal is drawn thereby into the quartz tube and cast. Heat from an acetylene torch or resistance heater was applied to the casting tube during the operation and rods having a diameter of .1 inch and a length of up to 8 inches were provided by these means.

EXAMPLE 7

In one specific method of manufacturing contact members, lengths of material provided by the casting technique of Example 6 were swaged through several dies, annealed at from 900 C. to 1000 C. for 10 to 30 minutes and further reduced by drawing and annealing operations to .015" diameter wire. For example, cast rods 0.1" in diameter of 2% Zn–98% Pd and 10% Zn–90% Pd were reduced 36% in area by swaging, annealed at 900 C. for 10 minutes, reduced 57% in area by drawing, annealed at 900 C. for 10 minutes, reduced 62% in area by drawing, reannealed and reduced 80% by drawing to 0.015" diameter wire.

For a 17% Zn–83% Pd alloy the ingot was swaged with intermediate annealing at 1000 C. for 20 minutes to 0.020 inch in diameter.

EXAMPLE 8

Zinc was alloyed with an alloy of 90% Pt–10% Ir by the vapor diffusion process according to Example 1. The platinum-iridium was heated at 1,000° C. for twelve hours in the presence of nickel-silver, an alloy of 55% Cu, 18% Ni and 27% Zn under an atmosphere of $H_2$. A case was formed.

EXAMPLE 9

Zinc was alloyed with an alloy of 90% Pt–10% Rh by the vapor diffusion process according to Example 1. The platinum-rhodium was heated at 1,000° C. for twelve hours in the presence of nickel-silver, an alloy of 55% Cu, 18% Ni and 27% Zn under an atmosphere of $H_2$. A case was formed.

EXAMPLE 10

Zinc was alloyed with an alloy of 90% Pt–10% Ru by the vapor diffusion process according to Example 1. The platinum ruthenium was heated at 1,000° C. for twelve hours in the presence of nickel-silver, an alloy of 55% Cu, 18% Ni and 27% Zn under an atmosphere of $H_2$. A case was formed.

EXAMPLE 11

Zinc was alloyed with an alloy of 90% Pt–6% Os by the vapor diffusion process according to Example 1. The platinum osmium was heated at 1,000° C. for twelve hours in the presence of nickel-silver, an alloy of 55% Cu, 18% Ni and 27% Zn under an atmosphere of $H_2$. A case was formed.

GENERAL CHARACTERISTICS

The resistivity and temperature coefficient of resistivity were determined for a sample containing 10% Zn and 90% Pt. A resistivity of about $2.7 \times 10^{-5}$ ohm–cm. was observed. The temperature coefficient of resistivity was approximately $1.3 \times 10^{-3}$ for temperatures from 30° C. to 300° C. Measurements were made potentiometrically using a type K potentiometer. Pure Pt and Zn have resistivities of $10 \times 10^{-6}$ and $6 \times 10^{-6}$ ohm–cm. respectively, at 20° C. They exhibit temperature coefficients of about $3.3 \times 10^{-3}$ and $3.7 \times 10^{-3}$ from 20° C. to 300° C. These comparisons reveal the alloy has a higher resistivity and lower temperature coefficient of resistivity than platinum or zinc alone. At higher temperatures the resistivity is not objectionable and is comparable to platinum. Thus, the element is not subject to adverse burning or melting.

Figure 11:
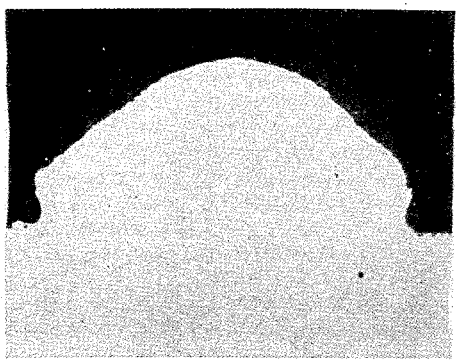
Figure 11 is an enlarged, polished, cross-sectional view showing a contact element of the present invention mounted on an iron nickel base and showing the fillet which forms between the contact and base.

As shown in Figure 11, 100 X, the novel contact materials of the present invention are easily attached to base contact or current-carrying members, in this case a nickel-iron magnetic type base, by spot welding. In such cases they readily form large fillets between the contact itself and the current-carrying member. These fillets apparently aid materially in securing the contact to the current-carrying base.

Figure 12:
Figure 12 is a view of a contact of the present invention showing the result of a life test of given severe conditions.
Figure 13:
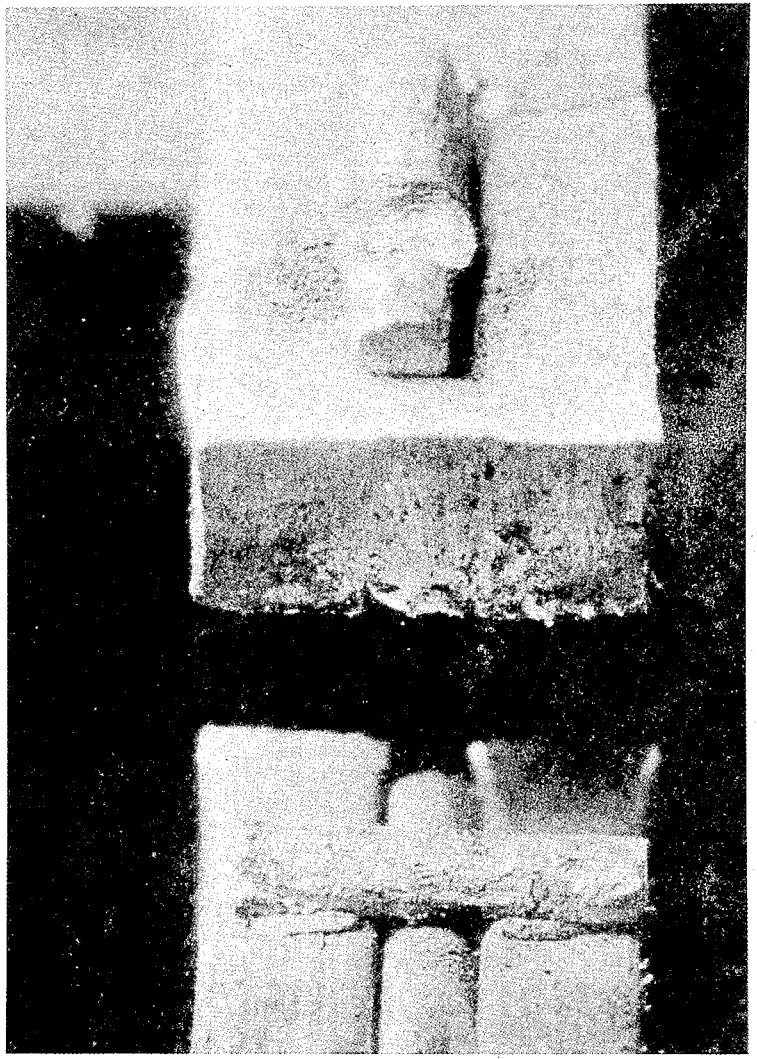
Figure 13 is a view similar to Figure 12, and shows the result of running a prior-art contact material for the same life test under the same conditions.

Tests were conducted utilizing the novel contact material in a conventional telephone relay of the well known McBerty type. As shown in the photomicrograph, Figure 12, the contacts of the present invention, mounted on each electrode as wires perpendicular to each other (which is the preferred form), are practically unaffected after a long period of operation, in the present case over 3 million operations (150 ma. load, ¼ mfd., 150 ohms). Platinum contacts under the same conditions of loading and operation are shown in Figure 13, where it is to be observed that the contacts have been badly worn. Life tests on the alloy of the present invention under conditions involving low value currents and frequent operation, such as are commonly experienced in the telephony and telegraphy fields, indicate that a life span in the order of twenty years may be expected as compared to two years for known materials.

The alloy made be used in both polarities of a contact set or in different combinations. The use of the platinum-zinc alloy as the cathode element against a pure platinum anode has been particularly successful in elementary tests. The use of other metals with the platinum-zinc alloy as the cathode have also proven successful.

In summary, it is readily seen that the present invention teaches a new and novel alloy or composition comprised of a member of the platinum family and zinc. The alloy is characterized in certain instances by the development of a hard case or phase of platinum or platinum family and zinc on a base material. The invention also teaches methods for providing members of a single phase of the alloys or of a plurality of phases. The contact alloys have a higher hardness and resistance to deformation than conventional materials and inhibit material transfer much better than other contact materials.

These alloys taught herein are especially suitable for low current applications, and can be used in both polarities, or either polarity, or in different combinations working against refractory metals or refractory compounds with metals, such as carbide materials, or with nonrefractory metals, such as gold and silver or their alloys, or other contact metals and alloys.

The results obtained with the new platinum-zinc alloy show that it welds more readily to electrically conducting supporting members than prior art metals or alloys used heretofore, and that the contacts of the present invention have good electrical and thermal conductivity, and resistance to the formation of surface films or corrosion.

The platinum-zinc alloy can be provided in various phases or combinations thereof as set forth in the several methods and processes taught herein. Further, the alloy may be cast, drawn or swaged to various desired forms which are more convenient to use.

What is claimed is:

1. An electrical contact member formed of an alloy consisting essentially of at least one member of the platinum family and zinc, said alloy not having in excess of about 35 percent by weight of zinc.

2. An electrical contact member consisting essentially of an alloy of platinum and zinc in at least one of the phases alpho and PtZn.

3. An electrical contact member for use with electrical equipment consisting of a platinum-zinc alloy contacting surface of the alpha phase having a Knoop hardness of from 100 to 150 numbers said alloy having not in excess of about 10 percent by weight of zinc.

4. The method of providing an electrical contact member consisting essentially of at least one member of the platinum group and zinc said zinc being not in excess of 35 percent by weight, which comprises the steps of measuring the member of the platinum group and zinc in powdered form to the desired composition, mixing same, compacting the mixture under high pressures in a die, placing same in an alundum crucible, melting the mass by induction heating at atmospheric pressure under an inert atmosphere, holding the mass in the molten state for approximately five minutes, and cooling same.

5. The method of providing an electrical contact member consisting essentially of a member of the platinum group and zinc, said zinc being not in excess of 35 percent by weight which includes the steps of mixing powder compacts of the desired composition and weight, sintering same at approximately 500° centigrade for six hours and at approximately 900° centigrade for one hour.

6. An electrical contact member formed of an alloy consisting essentially of zinc substitutionally diffused in at least one member of the platinum group, the alloy having not in excess of 35 percent by weight of zinc.

7. The method of providing an electrical contact member consisting essentially of platinum and zinc, said zinc being not in excess of 35 percent by weight, which comprises the steps of embedding the platinum in an intimately mixed pack of powdered alumina and zinc, and subjecting the mix to heat in the order of 500 to 750 degrees centigrade for approximately one hour.

8. An electrical contact member comprising a current conducting base having a surface comprised of an alloy consisting of a member of the platinum family and zinc, said alloy not having in excess of about 35 percent by weight of zinc.

References Cited in the file of this patent

UNITED STATES PATENTS

| | | |
|---|---|---|
| 949,837 | Page | Feb. 22, 1910 |
| 1,779,602 | Kingsbury | Oct. 28, 1930 |
| 2,058,857 | Emmert | Oct. 27, 1936 |
| 2,191,666 | Kieffer | Feb. 27, 1940 |
| 2,319,364 | Ziegs | May 18, 1943 |
| 2,406,172 | Smithells | Aug. 20, 1946 |
| 2,413,604 | Colbert et al. | Dec. 31, 1946 |
| 2,418,710 | Hensel | Apr. 8, 1947 |
| 2,432,657 | Colbert et al. | Dec. 16, 1947 |
| 2,446,908 | Corbin | Aug. 10, 1948 |

OTHER REFERENCES

Deville et al.: "Chemical News," vol. 46, July 7, 1882. Page 10 relied on.

Hodgkinson et al.: "Chemical Society Journal," new series, vol. 78, 1900, part 2. Page 282 relied on.

Hansen: "Aufban der Zweistofflegiunger," Ann Arbor: Edwards Bros., Inc., 1943, page 1026.

Rosenhain: "Introduction to Physical Metallurgy," New York, Van Nostrand, 1923, page 111.

Gmelins Handbuch, 8 Auflage, System-Nummer 68, Teil A-Lieferung 5, 1949. Page 582.